Dec. 12, 1933. F. KROSTA Re. 19,018

TOOL

Original Filed March 12, 1928

Frederick Krosta
INVENTOR.

Reissued Dec. 12, 1933

Re. 19,018

UNITED STATES PATENT OFFICE 19,018

TOOL

Frederick Krosta, New York, N. Y., assignor of one-half to Sol H. Seidman, New York, N. Y.

Original No. 1,765,165, dated June 17, 1930, Serial No. 261,159, March 12, 1928. Application for reissue October 12, 1931. Serial No. 568,431

6 Claims. (Cl. 81—9.5)

This invention relates to cutting instruments and in particular to a tool on the order of a plier which is arranged to sever the strand of an armoured wire covering without injuring the wire.

A particular object of the invention is to provide a cutter, particularly adapted for the severing of armoured cable, commonly known as BX and used to encase electric wires to prevent fire due to short-circuiting thereof.

It is well known in the electrical art that the cutting of the BX or armoured cable heretofore, has resulted in the cutting of the wires or piercing of the wire covering which is objectionable because it exposes the bare wire and provides a possibility for short circuiting when the wire has been placed in circuit.

A still further object of the invention is to provide a BX cutter in which a knife is positioned at substantially right angles to the convolution of the BX so that it will completely sever one of the convolutions and consequently permit the BX to be separated with a minimum of effort. Difficulty has been encountered heretofore in the cutting of the BX due to spiral winding thereof and a further object of my invention is to provide an anvil or bed upon which the BX is placed so that it will be held in the proper position relatively to the cutter so that the strand of the BX can be easily severed.

To enable others skilled in the art to fully comprehend the underlying features of my invention that they may embody the same in the various modification in structure and relation contemplated, a drawing has been annexed as part of this disclosure and in such drawing, similar reference characters denote corresponding parts throughout all the views, of which, Figure 1 is a view in side elevation showing my improved cutter.

Figure 1:
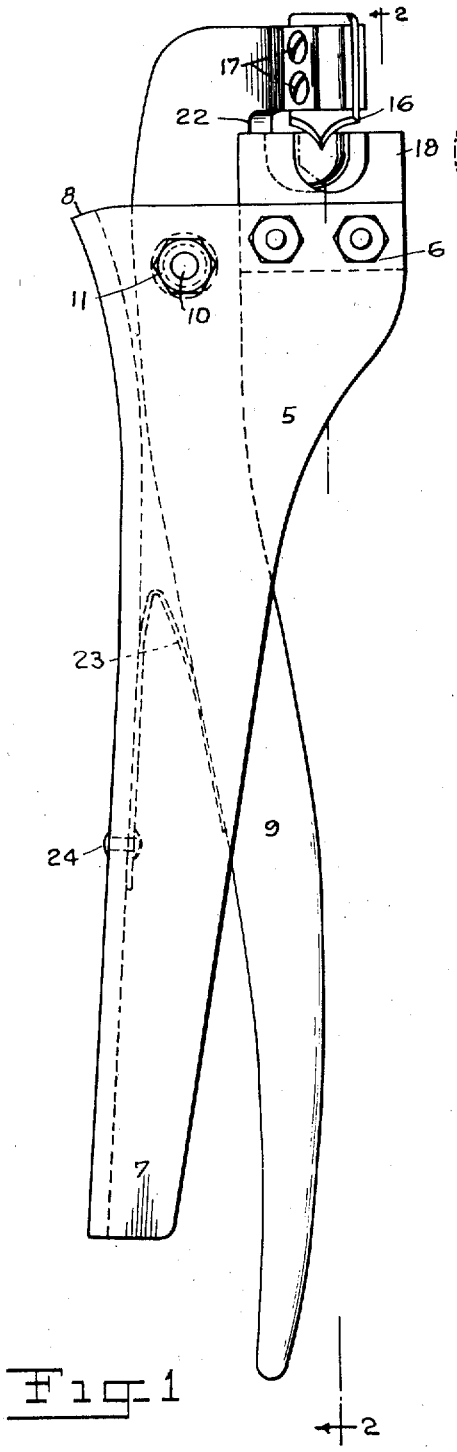
Figure 2:
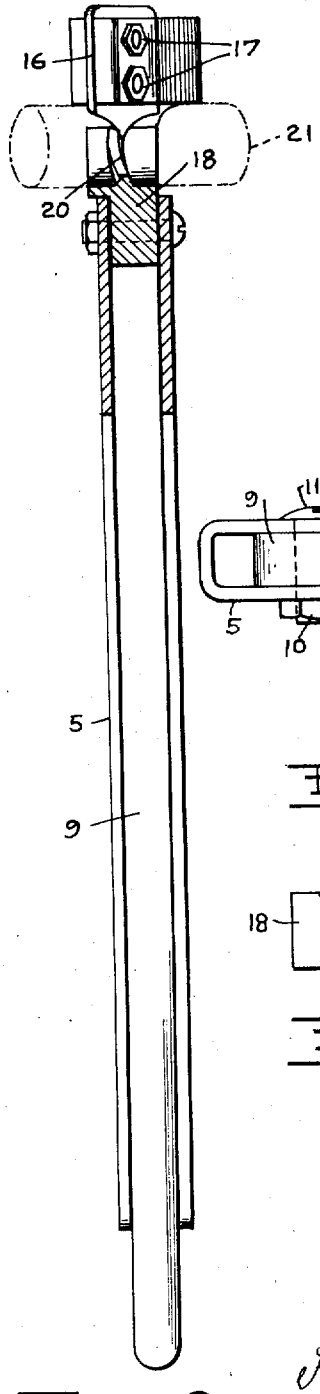
Figure 2 is a section taken on the line 2—2 of Figure 1 and illustrates how the anvil is provided with a concaved seat for the proper reception of the BX.
Figure 3:
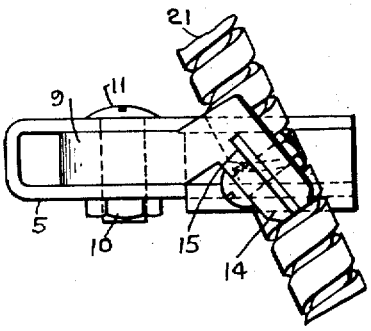
Figure 3 is a top plan view of the cutter, as illustrated in Figure 1, a piece of BX or armoured cable being shown in position ready for cutting.
Figure 4:
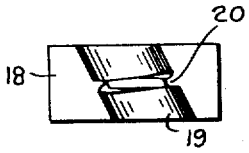
Figure 4 is a top plan view of the anvil or seat showing the semi-circular receptacle formed therein for the holding of the BX.

Referring to the drawing in detail, 5 indicates the holder which is made of heavy sheet metal or other suitable material and which is substantially U-shaped in cross section, the width of the holder preferably decreasing from the top 6 thereof to the lower edge 7. The closed portion of the upper end of the holder is slightly flared as at 8 to permit free operation of the cutter arm 9, this cutter arm being pivotally supported as at 10 on a bolt 11 which passes through the side wall of the holder 5 and maintains the cutter arm therebetween in operable position. The upper end of the cutter arm is bent to provide a slotted, cutter carrying end 14, the slot being indicated by the numeral 15 while the cutter itself is indicated by the numeral 16, the same being held in the end 14 through the medium of suitable screws 17. The cutter 16 is preferably provided with a pair of cutting edges converging to a point as shown in Figures 1 and 2. The upper end of the holder 5, at its open side is arranged to receive the supporting anvil 18. This anvil may be provided in its upper face with an armoured cable receiving groove of semi-circular formation, the groove being indicated by the numeral 19 and being provided centrally with an upstanding ridge 20, the groove being disposed at an angle relatively to the anvil and the ridge 20 being arranged spirally so that a piece of armoured cable or BX 21 could fit therein in position so that the cutter 16 would be substantially in alignment and centrally thereof, that is, it is desired to cut one of the convolutions of the BX or armoured cable and to have the knife enter it at its highest point. Therefore, it is evident that the knife will preferably be disposed directly over the ridge 20 and be central of the groove 19. It is quite evident that the ridge 20 will fit into one of the spiral grooves of the BX or armoured cable 21 and will be securely held in position so that the cutter 16 may pierce the shell thereof. In order that the movement of the cutter 16 may be limited, it will be noted that the upper end of the cutter arm 9 is provided with a slight offset portion 22 which is arranged to engage the anvil 18 and consequently limit the downward movement of the cutter 16 so that the same will just pierce the shell of the armoured cable and will not crush the wires nor break the protective coating formed thereon.

In order that the cutter arm may be held in position so that the cutter 16 is raised away from the anvil, I have provided between said cutter arm and the closed side of the holder 5, a leaf spring 23 which is secured through the medium of the rivets 24 to the holder, the free end thereof normally urging the cutter arm 9 to keep the cutter 16 in raised position relatively to the anvil.

It is quite evident, therefore, that I have provided a BX or armoured cable cutter which has few parts and one which permits the knife to be removed therefrom for sharpening and for adjustment.

It has been found in practice that the easiest way to sever a BX cable sheathing is to cut across one of the convolutions. The quickest way to accomplish this is to force the tip of a pointed cutter into the sheathing and as that point advances, an ever greater length of cutting edge becomes effective. If the cutting edge is longer than the convolution across which it operates, that convolution will be cut and the cable may be separated by a twist of the severed parts. It has also been found that any but a sharp, pointed tool will dent the sheathing until stopped by the wire therewithin, so that a cut through the thickness of the wall (as would occur with any other cutting tool to insure complete severance of the wall) will cause a cutting into the insulation of the wire, which is of course undesirable. Also, a piercing cutter requires less force than any other cutter.

It is also evident that I have provided in a tool of this character an anvil which will hold the BX in the proper position relatively to the cutter so that one of the convolutions thereof will be pierced without danger of crushing or piercing the wire covering.

It is evident therefore, that I have provided a tool which is constructed of few parts, can be made up cheaply and can be used for purposes of cutting longitudinally with the axis of a tubing supported thereby.

The lower ends of the pivoted arms 9 and 25 may be sharpened to provide a screw driver end, if desired.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention, what I claim as new and desire to secure by United States Letters Patent is:—

1. A tool for cutting spirally wound armoured conduits comprising a holder, an anvil in the holder having a transverse groove disposed at an angle to the horizontal median line of the holder, a ridge formed in the groove and arranged to fit between the spiral turns of the conduit, an arm pivoted in the holder and having a slotted end overhanging the anvil, a piercing tool in the slot, the tool being arranged to cut one of the convolutions of the conduit at a right angle to said convolution, and an anvil engaging offset portion on the arm for limiting the piercing movement of said cutting tool.

2. In a BX cable cutter, in combination, a movable cutter arm, a blade on said arm set at an angle to the plane of the arm movement, a concave anvil for supporting said cable and its sheathing, and means for retaining said anvil in operative relation to said blade so that a convolution of said cable sheathing lies across the plane of said blade.

3. In a BX cable cutter, in combination, a movable arm, a piercing and cutting blade on said arm set at an angle to the plane of the arm movement, a concave anvil in operative relation to said blade for so supporting a BX cable and its sheathing that a convolution of said cable sheathing is crossed by the plane of said blade and means for limiting the advance of said blade into said sheathing thereby to cut across said convolution thereof.

4. The combination of a pair of pivotal cross members, a mounting on one of said cross members for detachably supporting a cutting blade at an angle to the plane of movement of said members, and a concave holder on said other member for supporting a BX cable so that one of its convolutions lies across the plane of said blade, whereby pressure on said members will effect a slit across said convolution.

5. The combination of a pair of pivotal cross members, a mounting on one of said cross members for supporting a cutting blade at an angle to the plane of movement of said members, a blade having a piercing and cutting edge detachably secured to said mounting, and a concave holder on said other member for supporting a BX cable so that one of its convolutions lies across the plane of said blade whereby pressure on said members will effect movement of said blade relative to said holder and a slit across said convolution.

6. A tool comprising a holder, an arm pivoted in said holder, a concave anvil supported in one end of said holder and a piercing cutter blade carried by said arm at an angle to the plane of said arm and holder, said concave anvil disposed in operative relation to said blade and adapted to hold a BX cable with the convolutions thereof across the plane of said blade, said cutter blade being arranged to cooperate with the anvil in effecting a piercing of said cable sheathing and a cutting across a convolution for severing said sheathing.

FREDERICK KROSTA.